United States Patent [19]

Stohr

[11] Patent Number: 4,953,734
[45] Date of Patent: Sep. 4, 1990

[54] CABIN-LIKE COVER ESPECIALLY FOR COVERING A MACHINE

[76] Inventor: Albert Stohr, Am Wiegenberg 8, 8015 Markt Schwaben, Fed. Rep. of Germany

[21] Appl. No.: 317,944

[22] Filed: Mar. 2, 1989

[30] Foreign Application Priority Data

Mar. 11, 1988 [DE] Fed. Rep. of Germany ... 8803330[U]

[51] Int. Cl.$^5$ .......................... E04B 1/08; E04H 1/00
[52] U.S. Cl. .................................. 220/4.02; 52/588; 52/762; 52/403; 52/266; 220/4.33; 220/693
[58] Field of Search ................. 220/4 R; 52/588, 762, 52/403, 393, 395, 262, 266

[56] References Cited

U.S. PATENT DOCUMENTS

| | | | |
|---|---|---|---|
| 2,875,866 | 3/1959 | Hess | 52/762 X |
| 2,952,799 | 9/1960 | Wortman et al. | 52/262 X |
| 3,080,022 | 3/1963 | Mote | 52/762 X |
| 3,453,794 | 7/1969 | Blok | 52/762 X |
| 4,038,796 | 8/1977 | Eckel | 52/262 X |
| 4,283,897 | 8/1981 | Thompson | 52/588 X |
| 4,366,656 | 1/1983 | Simpson | 52/395 |

*Primary Examiner*—Paul T. Sewell
*Assistant Examiner*—Jacob K. Ackun, Jr.
*Attorney, Agent, or Firm*—Thomas & Kerr

[57] ABSTRACT

The wall elements (2, 2", etc.) of a cabin that is used to cover a machine include bends (2a, 2a'a) at their edges and the bends of adjacent wall elements are connected together by U-shaped connector bars (10, 10', 10") or bends (2a) and in some embodiments by sealing elements (9, 11a, 11b).

11 Claims, 3 Drawing Sheets

CABIN-LIKE COVER ESPECIALLY FOR COVERING A MACHINE

BACKGROUND OF THE INVENTION

The invention relates to a cabin-like cover especially for covering a machine.

A cabin-like cover is already known from DE-A-34 46 036, which corresponds to U.S. Pat. No. 4,700,517, in which alterations to the configuration of the side walls can be carried out at a later stage in a very simple manner, particularly without dismantling the entire cabin-like cover.

In this known cabin-like cover the wall elements are constructed as panels which preferably have an outer covering consisting of sheet material and an insulating material arranged in between. Such wall elements ensure excellent sound insulation which is desirable in many cases.

On the other hand, there are applications in which special sound insulation is not necessary. The object of the invention, therefore, is to provide a cabin-like cover suitable for cases of this kind which is distinguished by particularly simple and economic production and assembly.

SUMMARY OF THE INVENTION

According to the invention the material and the thickness of the wall elements are chosen so that the wall elements can be shaped by bending. The wall elements have inwardly directed bends at least on their edges facing the adjacent wall elements, and adjacent wall elements are connected to one another by their bends which butt agains one another.

The wall elements according to the invention are preferably made from sheet metal (particularly aluminium or steel) in a single-layer construction. It is also basically possible to conceive of a construction from plastics material or a suitable compound material.

There are a number of possible constructions for the connection of adjacent wall elements by means of the bends which butt against one another, and of these some are explained in greater detail with the aid of the embodiments.

In addition to their connecting function, the bends of the wall elements also serve the further purpose of reinforcing the wall elements, which makes it possible to choose a thin wall thickness.

BRIEF DESCRIPTION OF THE DRAWINGS

Some embodiments of the invention are illustrated in the drawings, in which.

DETAILED DESCRIPTION

Figure 1:
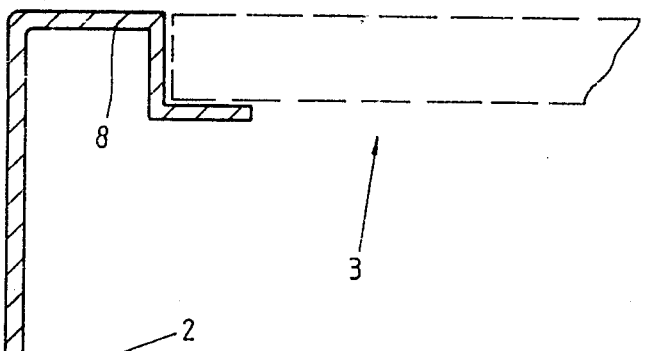
FIG. 1 shows a vertical section through a part of a cabin-like cover according to the invention.
Figure 1:
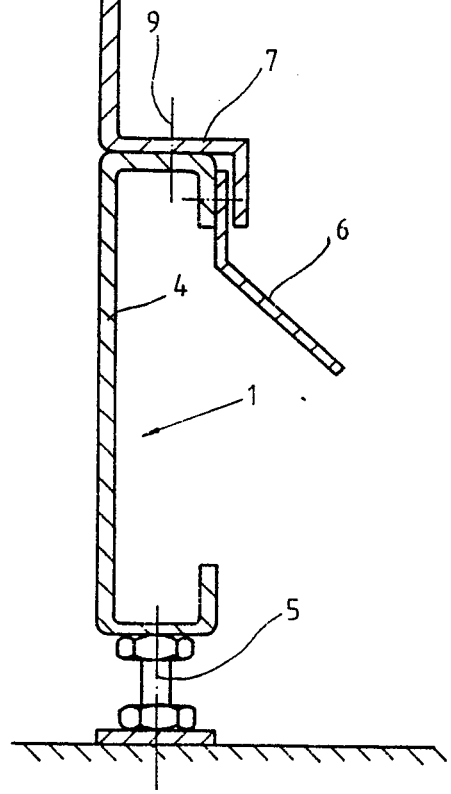

The cabin-like cover which is illustrated schematically in FIG. 1 comprises a base frame 1, wall elements 2 and roof elements 3.

The base frame 1 contains a C-shaped profile 4, adjustable feet 5 and shavings deflectors 6 pointing towards the interior of the cabin.

The wall elements 2, the connection of which to one another will be explained in greater detail with the aid of FIGS. 2 to 8, have on their lower edge an L-shaped bend 7 with which they engage over the base frame 1, especially the shavings deflector 6.

On their upper edge the wall elements 2 are provided with a Z-shaped bend 8 which forms a step corresponding to the thickness of the roof elements 3 and on which the roof elements 3 rest.

Figure 2:
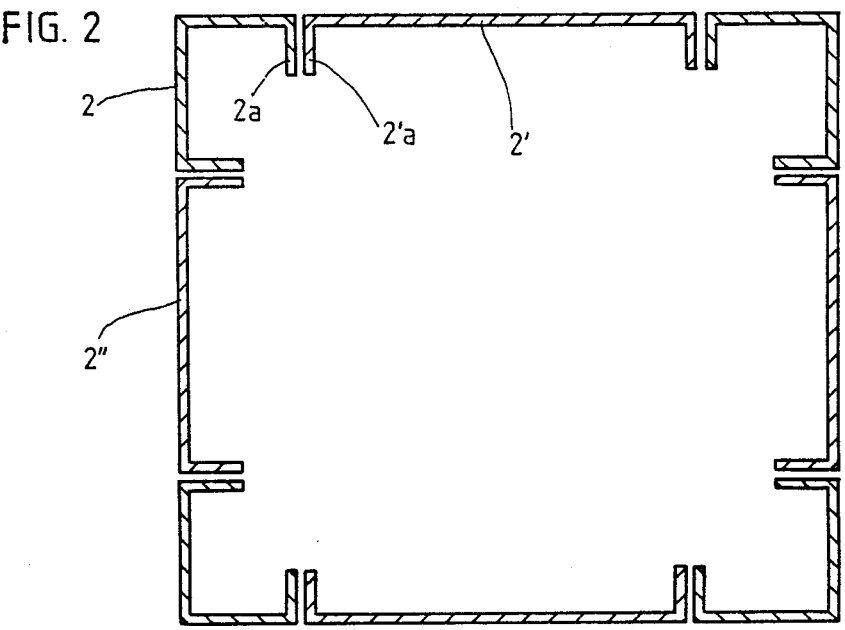
FIG. 2 shows a horizontal section through a schematically represented cabin-like cover.

FIG. 2 shows a horizontal section through a schematically represented cabin-like cover. The individual wall elements 2, 2', 2'' etc. have inwardly directed bends, e.g. 2a, 2'a, on their lateral edges facing the adjacent wall elements. Adjacent wall elements are connected to one another by means of these bends. Embodiments of these connections are illustrated in FIGS. 3 to 8.

Figure 3:
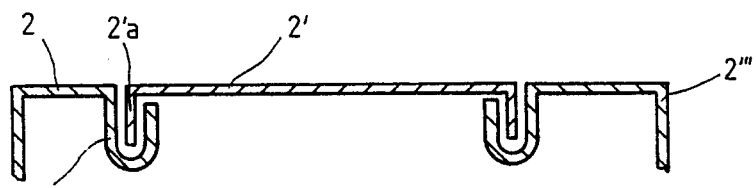
FIGS. 3 to 8 show sectional representations of several embodiments of the connection of adjacent wall elements.

According to FIG. 3 the wall element 2 has a bend 2b which is U-shaped in cross-section and open towards the exterior and in which the adjacent wall element 2' engages with a simple 90° bend 2'a.

The connection of the bends 2'a, 2b can be achieved for example by screwing, welding or pressing together.

In the case of a releasable connection the wall element 2' can be removed without it being necessary to remove the wall elements 2, 2'' which form the corner parts.

Figure 4:
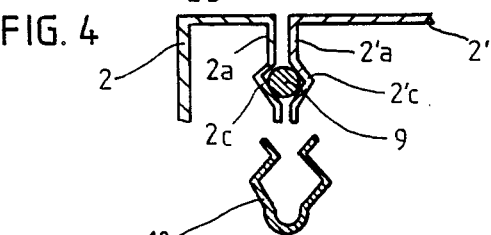

In the embodiment according to FIG. 4 the bends 2a, 2'a of adjacent wall elements 2, 2' are provided with an outwardly directed profile 2c, 2'c between which a sealing element 9 can be inserted.

A bar 10 made from springy material which is of complementary construction to the bends 2a, 2'a and comes into a releasable snap-in connection with these edges when it is pushed onto these edges serves for connection of the edges 2a, 2'a and for compression of the sealing element 9.

Figure 5:
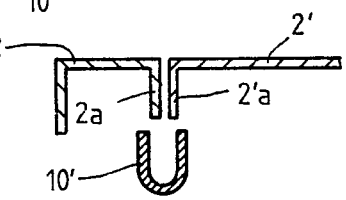

In the embodiment according to FIG. 5 the bar 10' is constructed as a simple U-profile and serves both for connection of the two adjacent wall elements 2, 2' and for sealing of the gap between the bends 2a, 2'a. For this purpose the bar 10' can either be made from steel or can be constructed as a compound profile (containing a rubber seal).

Figures 6, 7, 8:
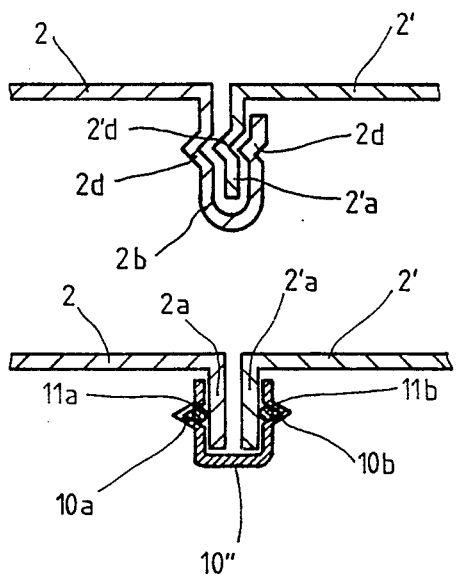

As indicated in FIG. 6, adjacent wall elements 2, 2' can be screwed, riveted or welded together by means of their bends 2a, 2'a. If required, a flat sealing element ca be arranged between the bends 2a, 2'a.

FIG. 7 shows a variant of the construction according to FIG. 3. The two bends 2b, 2'a are provided with complementary profiles 2d, 2'd which produce a releasable snap-in connection when they interengage.

Finally, FIG. 8 shows an embodiment in which the adjacent wall elements 2, 2' have simple 90° bends 2a, 2'a and the bar 10'' which serves for connection of the bends has profiles 10a, 10b which serve to hold sealing elements 11a, 11b.

The wall elements are advantageously connected to the base frame 1 by means of screws 9, as shown in FIG. 1.

In order to ensure that adjacent wall elements hold together well even in the region of the upper edge of the cabin, adjacent wall elements can also be connected, preferably screwed, to one other by means of bars which rest on the Z-shaped bends 8 (for example below the roof elements 3).

It will be understood that the foregoing description relates to preferred embodiments of the invention, and that changes and modifications and other embodiments can be made to the disclosed invention without departing from the spirit and scope of the invention as set forth in the following claims .

I claim:

1. A cabin-like cover, especially for covering a machine, including a base frame (1) and wall elements (2) mounted on said base frame in a modular system, characterized by the following features:
   (a) said wall elements characterized by having been formed of sheet material and shaped by bending, each of said wall elements including an L-shaped lower portion (7) for mounting on said base frame (1) of the cabin-like cover, said L-shaped lower portion comprising a first portion for positioning atop said base frame and a second portion depending from said first portion for engaging a side portion of said base frame;
   (b) said wall elements including at their side edges vertical bends (2a, 2'a) juxtaposed vertical bends of the adjacent wall elements; and
   (c) adjacent wall elements being connected to one another by fastener means securing said vertical bends to one another.

2. The cabin-like cover as claimed in claim 1, characterized in that said vertical bends (2a, 2'a) of adjacent wall elements (2, 2') are releasably connected to one another by means of a bar (10, 10', 10'') which engages over them.

3. The cabin-like cover as claimed in claim 2, characterized in that sealing elements (11a, 11b) are provided between said vertical bends (2a, 2'a) and said bar (10'') which engages over them.

4. The cabin-like cover as claimed in claim 1, characterized in that a sealing element (9) is provided between said vertical bends (2a, 2'a) of adjacent wall elements (2, 2').

5. The cabin-like cover as claimed in claim 2 characterized in that said bar (10) is produced from springy material and releasably connects said vertical bends (2a, 2'a) of adjacent wall elements (2, 2'').

6. The cabin-like cover (Cabin) as claimed in claim 4 characterized in that the bends (2a, 2'a) are provided with a profile (2c, 2c') forming a recess, a sealing element (9) positioned in said recess, and the bar (10) being of complementary construction to the bends.

7. The cabin-like cover as claimed in claim 2 characterized in that the bar (10') is at the same time constructed as a sealing element.

8. The cabin-like cover as claimed in claim 1, characterized in that each wall element (2) has a bend (2b) which is U-shaped in cross-section and open towards the exterior and the adjacent wall element (2') engages with a simple 90° bend (2'a) in this U-shaped bend.

9. The cabin-like cover as claimed in claim 1, characterized in that the bends (2a, 2'a) of adjacent wall elements (2, 2') are connected to one another by screwing, riveting or welding together.

10. The cabin-like cover as claimed in claim 1, characterized in that the wall elements (2) have on their upper edge a Z-shaped bend (8) which serves to support a roof element (3).

11. A cabin-like cover for covering a machine or the like including a base frame and wall elements mounted on said base frame,
    said base frame including a vertical panel, an upper lateral section extending horizontally from an upper portion of said panel and a flange member extending downwardly from said upper lateral section,
    said wall elements formed of sheet material characterized by having been bent to form their shape and each of said wall elements including a vertical panel, an L-shaped bend formed along the lower portion of each vertical panel, said L-shaped bend having a shape complementary to said base frame upper lateral section and said base frame flange member, said L-shaped bend including a horizontal leg positioned in abutment with said upper lateral section of said base frame and a downwardly extending lip positioned adjacent said base frame flange member,
    said wall elements further including a horizontally extending Z-shaped bend formed along the upper edge thereof comprising an upper horizontal section extending from the upper portion of said vertical panel, a descending section extending downwardly from said upper horizontal section, and a flange extending laterally from said descending section, and
    connector means attached to said base frame and said wall elements for securing the lower portion of said wall elements to said base frame.

* * * * *